(12) United States Patent
Gopalan

(10) Patent No.: US 11,049,005 B2
(45) Date of Patent: Jun. 29, 2021

(54) METHODS, DEVICES AND SYSTEMS FOR MANAGING NETWORK VIDEO TRAFFIC

(71) Applicant: AT&T INTELLECTUAL PROPERTY I, L.P., Atlanta, GA (US)

(72) Inventor: Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 951 days.

(21) Appl. No.: 15/465,997

(22) Filed: Mar. 22, 2017

(65) Prior Publication Data

US 2018/0276538 A1 Sep. 27, 2018

(51) Int. Cl.
| | |
|---|---|
| *G06N 3/08* | (2006.01) |
| *G06N 7/00* | (2006.01) |
| *G06N 3/04* | (2006.01) |
| *H04N 21/647* | (2011.01) |

(52) U.S. Cl.
CPC .............. *G06N 3/08* (2013.01); *G06N 3/04* (2013.01); *G06N 7/005* (2013.01); *H04N 21/64723* (2013.01)

(58) Field of Classification Search
None
See application file for complete search history.

(56) References Cited

U.S. PATENT DOCUMENTS

| | | | | |
|---|---|---|---|---|
| 5,381,513 A | * | 1/1995 | Tsuboka | G10L 15/142 704/232 |
| 5,987,442 A | * | 11/1999 | Lewis | H04L 43/00 706/10 |
| 6,947,378 B2 | | 9/2005 | Wu et al. | |
| 7,706,384 B2 | | 4/2010 | van Beek et al. | |
| 8,406,134 B2 | | 3/2013 | Johnston et al. | |
| 8,531,961 B2 | | 9/2013 | Stanwood et al. | |
| 8,972,145 B2 | | 3/2015 | Mahler et al. | |

(Continued)

FOREIGN PATENT DOCUMENTS

KR 101161249 B1 6/2012

OTHER PUBLICATIONS

Cui, Yuwei et al., "Continuous online sequence learning with an unsupervised neural network model", arXiv preprint arXiv:1512.05463, 2015, 1-17.

(Continued)

*Primary Examiner* — Luis A Sitiriche
*Assistant Examiner* — Casey R. Garner
(74) *Attorney, Agent, or Firm* — Guntin & Gust, PLC; Atanu Das

(57) ABSTRACT

Aspects of the subject disclosure may include, for example, embodiments provisioning a neural network comprising a plurality of layers. Further embodiments include provisioning a plurality of Markov logic state machines among the plurality of layers of the neural network resulting in a machine learning application. Additional embodiments include training the machine learning application using historical network video traffic resulting in a trained machine learning application. Also, embodiments include receiving current network video traffic. Embodiments include provisioning network resources to route the current network video traffic according to the trained machine learning application. Other embodiments are disclosed.

20 Claims, 12 Drawing Sheets

(56) References Cited

U.S. PATENT DOCUMENTS

| | | |
|---|---|---|
| 9,060,208 B2 | 6/2015 | Rieger et al. |
| 9,378,065 B2 | 6/2016 | Redmond et al. |
| 9,535,563 B2 | 1/2017 | Hoffberg |
| 9,552,550 B2 | 1/2017 | Vasseur et al. |
| 2002/0176361 A1 | 11/2002 | Wu et al. |
| 2006/0223649 A1 | 10/2006 | Rife et al. |
| 2012/0023226 A1 | 1/2012 | Petersen et al. |
| 2012/0063404 A1 | 3/2012 | Wagner et al. |
| 2014/0113600 A1 | 4/2014 | El Gamal et al. |
| 2014/0321378 A1 | 10/2014 | Zhang et al. |
| 2015/0009857 A1 | 1/2015 | Rath et al. |
| 2015/0012257 A1 | 1/2015 | Backholm et al. |
| 2015/0142962 A1* | 5/2015 | Srinivas ............ H04L 41/0893 709/224 |
| 2015/0215832 A1 | 7/2015 | Fitzpatrick |
| 2015/0237609 A1 | 8/2015 | Sun |
| 2015/0319093 A1 | 11/2015 | Stolfus |
| 2015/0333986 A1 | 11/2015 | Pang |
| 2016/0026922 A1 | 1/2016 | Vasseur et al. |
| 2016/0028599 A1* | 1/2016 | Vasseur ................ H04L 41/16 370/252 |
| 2016/0028608 A1 | 1/2016 | Dasgupta et al. |
| 2016/0028616 A1 | 1/2016 | Vasseur |
| 2016/0057654 A1 | 2/2016 | Backholm et al. |
| 2016/0242117 A1 | 8/2016 | Lin et al. |
| 2016/0294702 A1 | 10/2016 | Kodialam et al. |
| 2017/0230267 A1* | 8/2017 | Armolavicius ..... H04L 41/5025 |
| 2018/0278543 A1 | 9/2018 | Gopalan |

OTHER PUBLICATIONS

Dainotti, Alberto et al., "Internet traffic modeling by means of Hidden Markov Models", Computer Networks 52.14, 2008, 2645-2662.

Elias, Jocelyne, "Joint QoS Routing and Dynamic Capacity Dimensioning with Elastic Traffic a Game Theoretical Perspective", IEEE, 2010.

Lien, Shao-Yu, "Cognitive and game-theoretical radio resource management for autonomous femtocells with QoS guarantees", IEEE Transactions on Wireless Communications 10.7 2196-2206., 2011.

Maheswaran, C.P., "Utilizing EEM approach to tackle bandwidth allocation with respect to heterogeneous wireless networks", ICT Express 2.2: 80-86., 2016.

Nguyen, Thuy T. et al., "A survey of techniques for internet traffic classification using machine learning", IEEE Communications Surveys Tutorials 10.4, 2008, 56-76.

Zhang, QI et al., "Cloud computing: state-of-the-art and research challenges", Journal of internet services and applications 1.1, Apr. 20, 2010, 7-18.

Zhang, Yichi, "Residential Network Traffic and User Behavior Analysis", KTH—Royal Institute of Technology, Nov. 9, 2010, 1-62.

* cited by examiner

260

400

500

1100

METHODS, DEVICES AND SYSTEMS FOR MANAGING NETWORK VIDEO TRAFFIC

RELATED APPLICATION(S)

U.S. patent application Ser. No. 15/465,834 filed Mar. 22, 2017, by Gopalan, entitled "METHODS, DEVICES AND SYSTEMS FOR MANAGING NETWORK VIDEO TRAFFIC" is related to the pending application. All sections of the aforementioned application is incorporated herein by reference in its entirety.

FIELD OF THE DISCLOSURE

The subject disclosure relates to methods, devices, and systems for managing network video traffic.

BACKGROUND

Users request video content from different devices across different communication networks. The difference devices include wearable devices, mobile phones, tablet computers, laptop computers, desktop computers, etc. The video content can be requested from media content servers that store and stream/download video content. Further, content producers may stream video of live events to users. Thus, communication networks manage and support streaming/downloading of stored video content from media content providers as well as support streaming video of live events.

BRIEF DESCRIPTION OF THE DRAWINGS

Reference will now be made to the accompanying drawings, which are not necessarily drawn to scale, and wherein.

DETAILED DESCRIPTION

Figure 1:
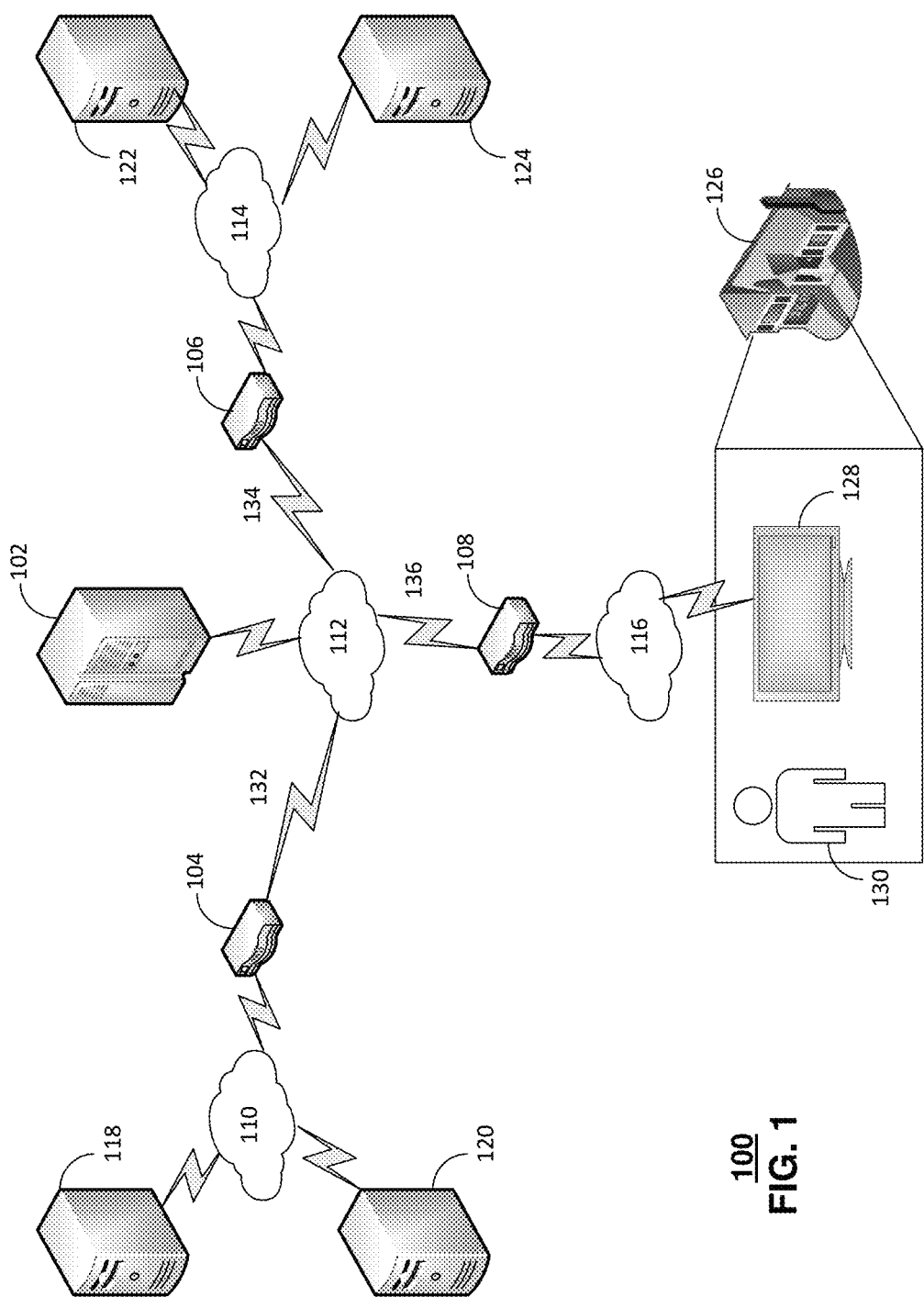
FIG. 1 depicts an illustrative embodiment of a system for managing network video traffic.

The subject disclosure describes, among other things, illustrative embodiments include provisioning a neural network comprising multiple layers. Further embodiments include provisioning multiple Markov logic state machines among the multiple layers of the neural network resulting in a machine learning application. Additional embodiments include training the machine learning application using historical network video traffic resulting in a trained machine learning application. Also, embodiments include receiving current network video traffic. Embodiments include provisioning network resources to route the current network video traffic according to the trained machine learning application. Other embodiments are described in the subject disclosure.

One or more aspects of the subject disclosure include a device comprising a processing system including a processor and a memory that stores executable instructions that, when executed by the processing system, facilitate performance of operations. Operations can include provisioning a neural network comprising multiple layers. Further operations can include provisioning multiple Markov logic state machines among the multiple layers of the neural network resulting in a machine learning application. Additional operations can include training the machine learning application using historical network video traffic resulting in a trained machine learning application. Also, operations can include receiving current network video traffic. Operations can include provisioning network resources to route the current network video traffic according to the trained machine learning application.

One or more aspects of the subject disclosure include a machine-readable storage medium, comprising executable instructions that, when executed by a processing system including a processor, facilitate performance of operations. Operations can include provisioning a neural network comprising multiple layers. Further operations can include provisioning multiple Markov logic state machines among the multiple layers of the neural network resulting in a machine learning application. Additional operations can include training the machine learning application using historical network video traffic resulting in a trained machine learning application. Also, operations can include determining the multiple layers of the neural network according to the training based on the historical network video traffic receiving current network video traffic. Operations can include provisioning network resources to route the current network video traffic according to the trained machine learning application.

One or more aspects of the subject disclosure include a method. The method can include provisioning, by a processing system including processor, a neural network comprising multiple layers. Further, the method can include provisioning, by the processing system, multiple Markov logic state machines among the multiple layers of the neural network resulting in a machine learning application. In addition, the method can include training by the processing system, the machine learning application using historical network video traffic resulting in a trained machine learning application. Also, the method can include determining by the processing system, the multiple Markov logic state machines according to the historical network video traffic. The method can include receiving by the processing system, current network video traffic. Further, the method can include provisioning by the processing system, network resources to route the current network video traffic according to the trained machine learning application.

FIG. 1 depicts an illustrative embodiment of system 100 for managing network video traffic. In one or more embodiments, system 100 includes a network manager 102 communicatively coupled to routers 104, 106, 108 over communication network 112. Further, the routers 104, 106 can be communicatively coupled to media servers 118, 120, 122, 124 over communication networks 110, 114. In addition, router 108 can be communicatively coupled, via communication network 116, to a media device 128 located on customer premises 126 and viewed by a user 130 to access media content from the media servers 118, 120, 122, 124. In other embodiments, mobile devices such as smartphones, tablet computers, laptop computers, and wearable device may be used communicatively coupled to the media servers 118, 120, 122, 124 to access media content as well as other media devices (e.g. desktop computers, etc.).

In one or more embodiments, the network manager 102 can allocate network resources such as processing capacity on routers 104, 106, 108 and bandwidth on communication links 132, 134, 136 based on the network video traffic across communication networks 110, 112, 114, 116. Such allocation of network can be done dynamically and/or real time. The network manager 102 can include a machine learning application stored in memory and implemented by a processing system of the network manager 102. The processing system can be co-located with the router 104, 106, 108 or distributed among different locations (e.g. cloud environment, distributed processing environment, etc.) The machine learning application can include a neural network integrated with one or more Markov logic state diagrams.

In one or more embodiments, prior to implementing machine learning application on actual/current network video traffic, the machine learning application is trained with historical network video traffic. In some embodiments, the historical network video traffic can be actual historical network video traffic recorded/measured traffic at different points within communication networks 110, 112, 114, 116, communication links 132, 134, 136, and/or routers 104, 106, 108. Further, the historical network video traffic can be recorded at different times to provide a robust set of training data for the machine learning application. In other embodiments, the historical network video traffic can calculated based on historical network video traffic of similar communication networks or calculated based on the historical network video traffic produced by similarly situated media content servers 118, 120, 122, 124.

In one or more embodiments, the network manager 102 can detect current network video traffic from media content servers 118, 120, 122, 124. For example, media servers 118, 120, 122, 124 can provide high network video traffic at certain times of day such as in the evenings between 7 pm-10 pmET when most people are at home and request streaming media content. At other times of day, media servers 118, 120, 122, 124 provide low network video traffic. Such network video traffic can be according to the data used to train the machine learning application on the network manager 102. Consequently, the network manager 102 allocates a certain (low) level of network resources to the communication networks 110, 112, 114, 116 communicatively coupled to the media servers 118, 120, 122, 124. For example, when the network video traffic is at a high level, routers 104, 106, 108 can be provisioned by the network manager 102 with more memory from storage devices (remote or co-located storage devices) and processing power (from co-located or distributed, cloud processing systems). Further, the network manager 102 can provision more bandwidth capacity on communication links 132, 134, 136. For example, communication links 132, 134, 136 can be optical communication links that can carry multiple wavelengths of optical communications. The network manager can provision more wavelengths on the communication links 132, 134, 136 to carry more media content from media servers 118, 120, 122, 124 to customer premises 126.

Figure 2A:
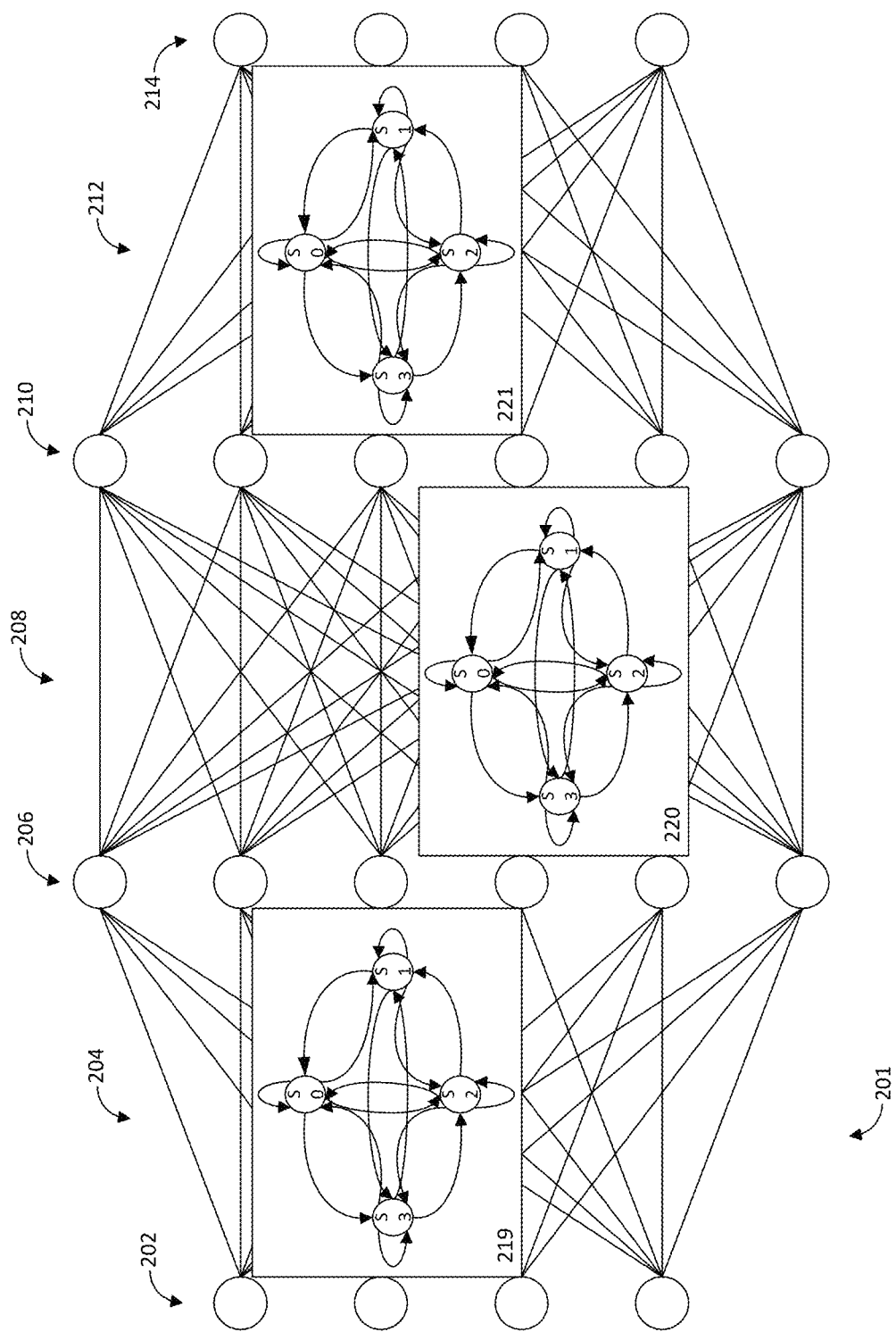
FIG. 2A depicts an illustrative embodiment of a neural network integrated with Markov logic state machines used in managing network video traffic.

FIG. 2A depicts an illustrative embodiment of a neural network integrated with Markov logic state machines used in managing network video traffic. In one or more embodiments, the network manager 102 includes a machine learning application that uses a statistic-syntactic (model) system 200 comprising the neural network 201 integrated with Markov logic state machines 219, 222, 221. The neural network 201 includes an input layer 202, several hidden layers 206, 210, and an output layers 214. Each layer comprises multiple nodes. Each node of one layer is interconnected with nodes in a neighboring layers. Such interconnections 204, 208, 212 can be driven by the Markov logic state machines 219, 220, 221.

In one or more embodiments, each node can be a processor with a transfer function that processes many inputs into an output. Further, each of the inputs can be weighted. For example, a processor can model/correspond a communication link in a network. Each input can be the bandwidth for streams of media content provided by a media server 118, 120, 122, 124. Further, a weight for each input can be according to the potential highest level of bandwidth of the aggregate media content provided by each media server 118, 120, 122, 124 or the bandwidth allocated according to agreements for quality of service for each of the media servers 118, 120, 122, 124 by the service provider operating the network manager 102. In addition, the neural network is trained with historical network video traffic. For example, a node may model a communication link and may have four inputs, each of which model/correspond a video traffic from each of four media servers, 118, 120, 122, 124. The inputs modeling video traffic from media servers 118, 120, 122 may be weighted with a factor of 1 and the input modeling video traffic from media server 124 may be weighted with a factor of 2. That is, the model allows twice as much bandwidth to be allocated to video traffic from media server 124 than to video traffic from media servers 118, 120, 122. The weights can be configured according to the potential high level of bandwidth that can be provided by each of the media servers 118, 120, 122, 124 or according to agreements between the service provider and the different media content providers operating media servers 118, 120, 122, 124. For example, media server highest level of output can be 100 Gbps while the highest level of output for each of the media servers 118, 120, 122 is 50 Gbps.

Figure 2B:
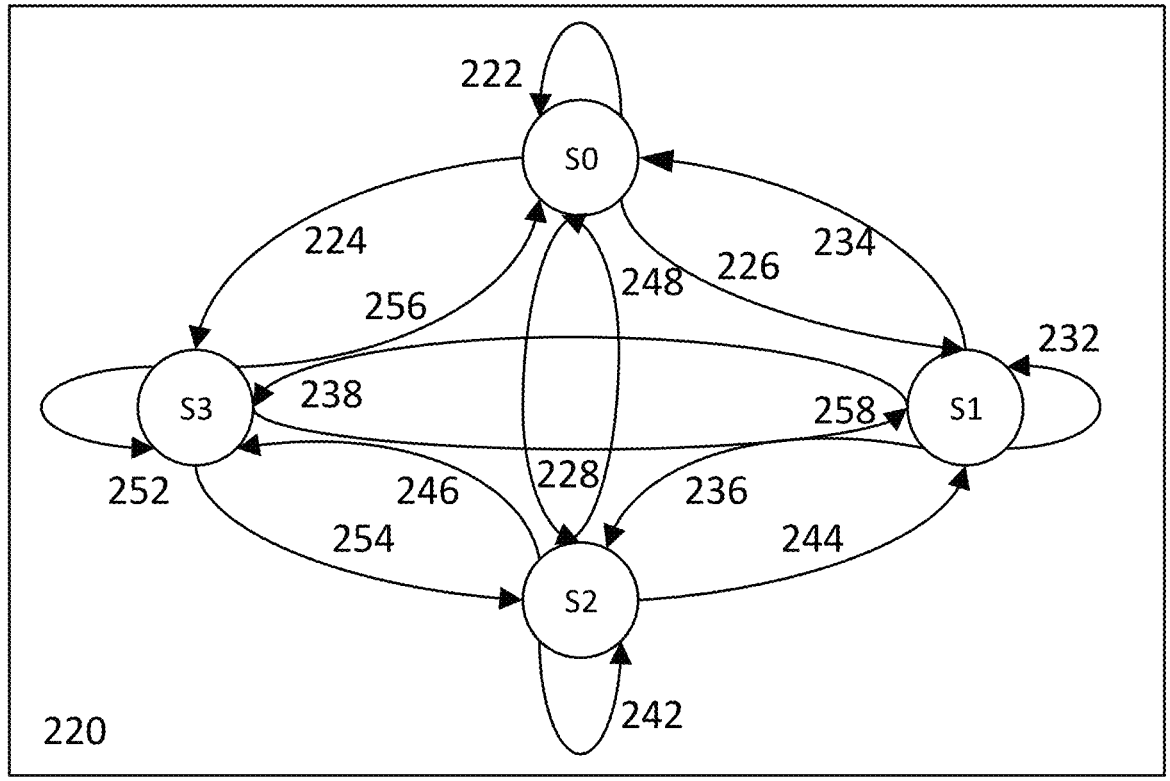
FIG. 2B depicts an illustrative embodiment of a Markov logic state machine used in managing network video traffic.

FIG. 2B depicts an illustrative embodiment of a Markov logic state machine 220 used in managing network video traffic. In one or more embodiments, a Markov logic state machine 220 can include four states, S0, S1, S2, S3 representing the bandwidth of a communication link, processing power of a router, or other network resources of a communication network that carries, processes, or stores network video traffic. S0 may indicate a low level equilibrium state for the network resource. S2 may indicate a high level equilibrium state for the network resource. S1 can indicate a negative transition state of resources for the network resource, and S3 can indicate a positive transition state of resources for the network resource. Further, state transitions 222, 224, 226, 228, 232, 234, 236, 238, 242, 244, 246, 248, 252, 254, 256, 258 indicate the probabilities of transitioning from one state to another or remaining in the same state. The probabilities for one or more state transitions can change over time.

For example, if the Markov logic state machine 220 models a communication link having a capacity of 200 Gbps, then S0 may be a low level equilibrium state of operating at 50 Gbps. Further, S2 may be a high level equilibrium state of operating at 150 Gbps. S1 may be a negative transition state that indicates capacity of the communication link is decreasing at an increment of 10 Gbps. S3 may be a positive transition state that indicates capacity of the communication link is increasing at an increment of 10 Gbps. In addition, the probability of state transitions 222, 224, 226, 228, 232, 234, 236, 238, 242, 244, 246, 248, 252, 254, 256, 258 can change over time.

Furthering the example, during 9 am-5 pm on weekdays, the bandwidth capacity of the communication link is at a low level of equilibrium of 50 Gbps because many people are at work and not streaming or downloading video content from media servers 118, 120, 122, 124. Thus, probability of the state transition 222 for the communication link to remain in such a state may be high (e.g. 95%). Further, the probability of the state transitions 224, 226, 228 to increase or decrease the bandwidth of the communication link by 10 Gbps (e.g. 2% each) or transitioning to the high level equilibrium state (e.g. 1%) may be relatively low. Further, if during 9 am-5 pm on weekdays the Markov state machine is in state S1 or S3, then it may be a rare occurrence. The probability of state transitions 234, 256 from S1 and S3 to S0 can be high (e.g. 95%), and the other probabilities of state transitions 232, 238, 252, 258 (e.g. 2%) to S1 and S3 to be low. In addition, the probability for state transitions 236, 254 from S1 and S3 to S2 can also be low (e.g. 1%). Also, if during 9 am-5 pm on weekdays the Markov state machine is in state S2, then it may be a rare occurrence. The probability of the state transition 248 to S0 may be high (e.g. 95%). Further, the probability of state transitions 244, 246 from S2 to S1 and S3 may be low (e.g. 2%) as well as to remaining in S3 (e.g. 1%).

In another example, during 7 pm-10 pm on weekdays, the bandwidth capacity of the communication link is may start a low level of equilibrium of 50 Gbps but may steadily increase to a high level of equilibrium of 150 Gbps due to people being home from work and streaming and downloading media content to relax after a hard day at work. Thus, probability of the state transition 222 for the communication link to remain in such a state may be low (e.g. 10%). Further, the probability of the state transitions 224, 226, 228 to increase or decrease the bandwidth of the communication link by 10 Gbps or transitioning to the high level equilibrium state (e.g. 30%) may be relatively high. Further, the probability of state transitions 234, 256 from S1 and S3 to S0 can be low (e.g. 10%), and the other probabilities of state transitions 232, 238, 252, 258 to S1 and S3 as well as the probability for state transitions 236, 254 from S1 and S3 to S2 to be high (e.g. 30%). Also, if during 9 am-5 pm on weekdays the Markov state machine is in state S2, then it may be a likely occurrence. The probability of the state transition 248 to S0 may be low (e.g. 10%). Further, the probability of state transitions 244, 246 from S2 to S1 and S3 may be high (e.g. 30%) as well as to remaining in S3 (e.g. 30%). When integrated with the neural network, once a Markov logic state machine remains in a high level equilibrium state, it triggers the neural network/machine learning application of the network manager 102 to allocate further network resources (e.g. increase the bandwidth capacity of the communication link by adding wavelengths to an optical communication link).

In a further example, if the Markov logic state machine 220 models a router processing capacity, then S0 may be a low level equilibrium state of operating at 25%. Further, S2 may be a high level equilibrium state of operating at 75%. S1 may be a negative transition state that indicates processing capacity of the router is decreasing at an increment of 5%. S3 may be a positive transition state that indicates processing capacity of the router is increasing at an increment of 5%. In addition, the probability of state transitions 222, 224, 226, 228, 232, 234, 236, 238, 242, 244, 246, 248, 252, 254, 256, 258 can change over time.

Furthering the example, during 9 am-5 pm on weekdays, the processor capacity of the router is at a low level of equilibrium of 5% because many people are at work and not streaming or downloading video content from media servers 118, 120, 122, 124. Thus, probability of the state transition 222 for the communication link to remain in such a state may be high (e.g. 95%). Further, the probability of the state transitions 224, 226, 228 to increase or decrease the processor capacity of the communication link by 5% (e.g. 2% each) or transitioning to the high level equilibrium state (e.g. 1%) may be relatively low. Further, if during 9 am-5 pm on weekdays the Markov state machine is in state S1 or S3, then it may be a rare occurrence. The probability of state transitions 234, 256 from S1 and S3 to S0 can be high (e.g. 95%), and the other probabilities of state transitions 232, 238, 252, 258 (e.g. 2%) to S1 and S3 to be low. In addition, the probability for state transitions 236, 254 from S1 and S3 to S2 can also be low (e.g. 1%). Also, if during 9 am-5 pm on weekdays the Markov state machine is in state S2, then it may be a rare occurrence. The probability of the state transition 248 to S0 may be high (e.g. 95%). Further, the probability of state transitions 244, 246 from S2 to S1 and S3 may be low (e.g. 2%) as well as to remaining in S3 (e.g. 1%).

In another example, during 7 pm-10 pm on weekdays, the processor capacity of the router may start a low level of equilibrium of 25% but may steadily increase to a high level of equilibrium of 75% due to people being home from work and streaming and downloading media content to relax after a hard day at work. Thus, probability of the state transition 222 for the processing capacity of the router to remain in such a state may be low (e.g. 10%). Further, the probability of the state transitions 224, 226, 228 to increase or decrease the processor capacity of the router by 5% or transitioning to the high level equilibrium state (e.g. 30%) may be relatively high. Further, the probability of state transitions 234, 256 from S1 and S3 to S0 can be low (e.g. 10%), and the other probabilities of state transitions 232, 238, 252, 258 to S1 and S3 as well as the probability for state transitions 236, 254 from S1 and S3 to S2 to be high (e.g. 30%). Also, if during 9 am-5 pm on weekdays the Markov state machine is in state S2, then it may be a likely occurrence. The probability of the state transition 248 to S0 may be low (e.g. 10%). Further, the probability of state transitions 244, 246 from S2 to S1 and S3 may be high (e.g. 30%) as well as to remaining in S3 (e.g. 30%). When integrated with the neural network, once a Markov logic state machine remains in a high level equilibrium state, it triggers the neural network/machine learning application of the network manager 102 to allocate further network resources (e.g. increase the processor capacity of the router by allocating more processors from a distributed processing environment to the router).

In one or more embodiments, the Markov logic state machines 219, 220, 221 can be used with the inputs to nodes within the neural network. Further, the Markov logic state machines can be used to develop weights for the inputs to nodes in each layers of the neural network. Incorporating the Markov logic state machine with a neural network allows for a network manager to more robustly allocate network resources to efficiently carry the current network video traffic across communication networks.

Figure 3:
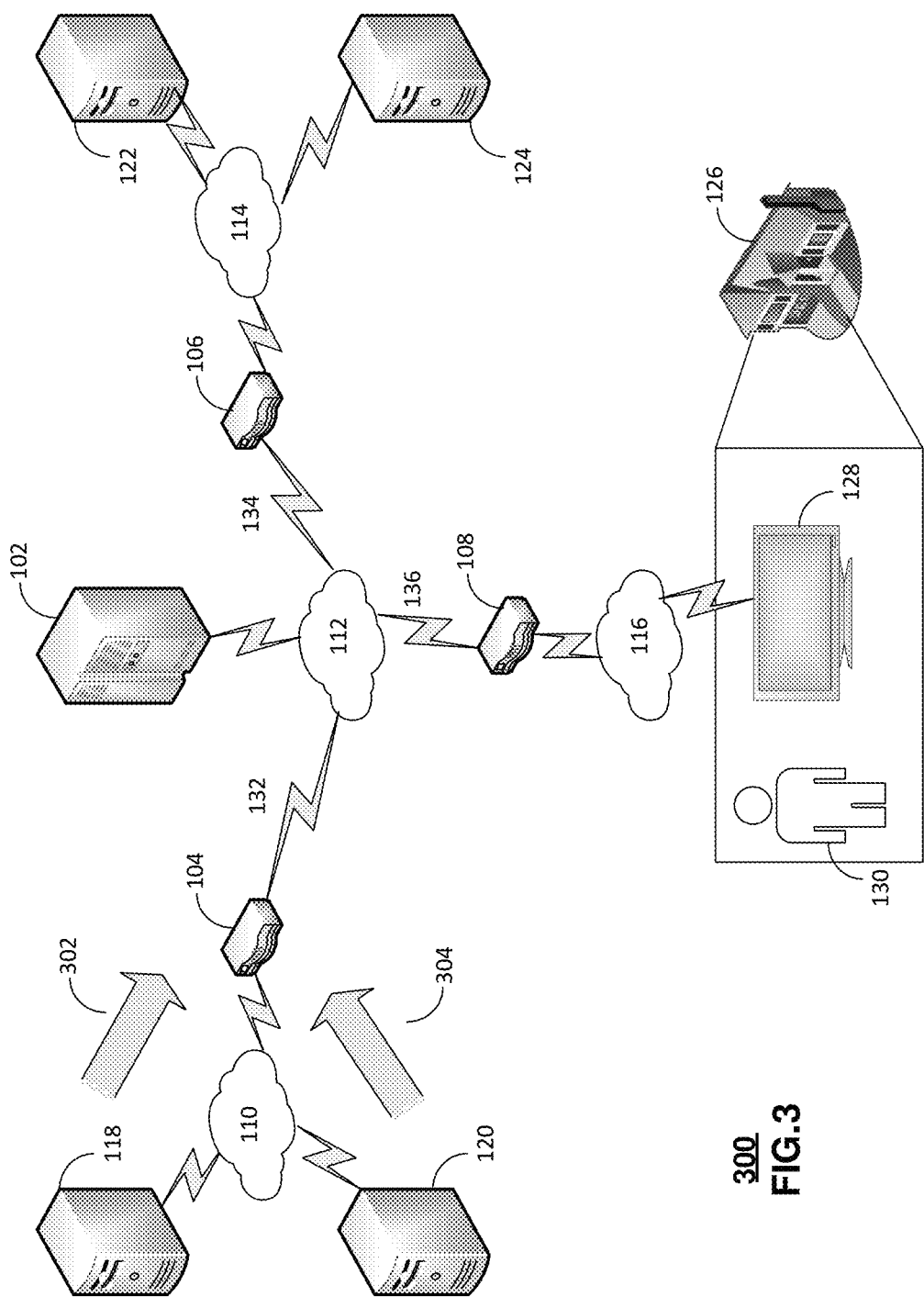
FIGS. 3-4 depict illustrative embodiments of systems for managing network video traffic.
Figure 4:
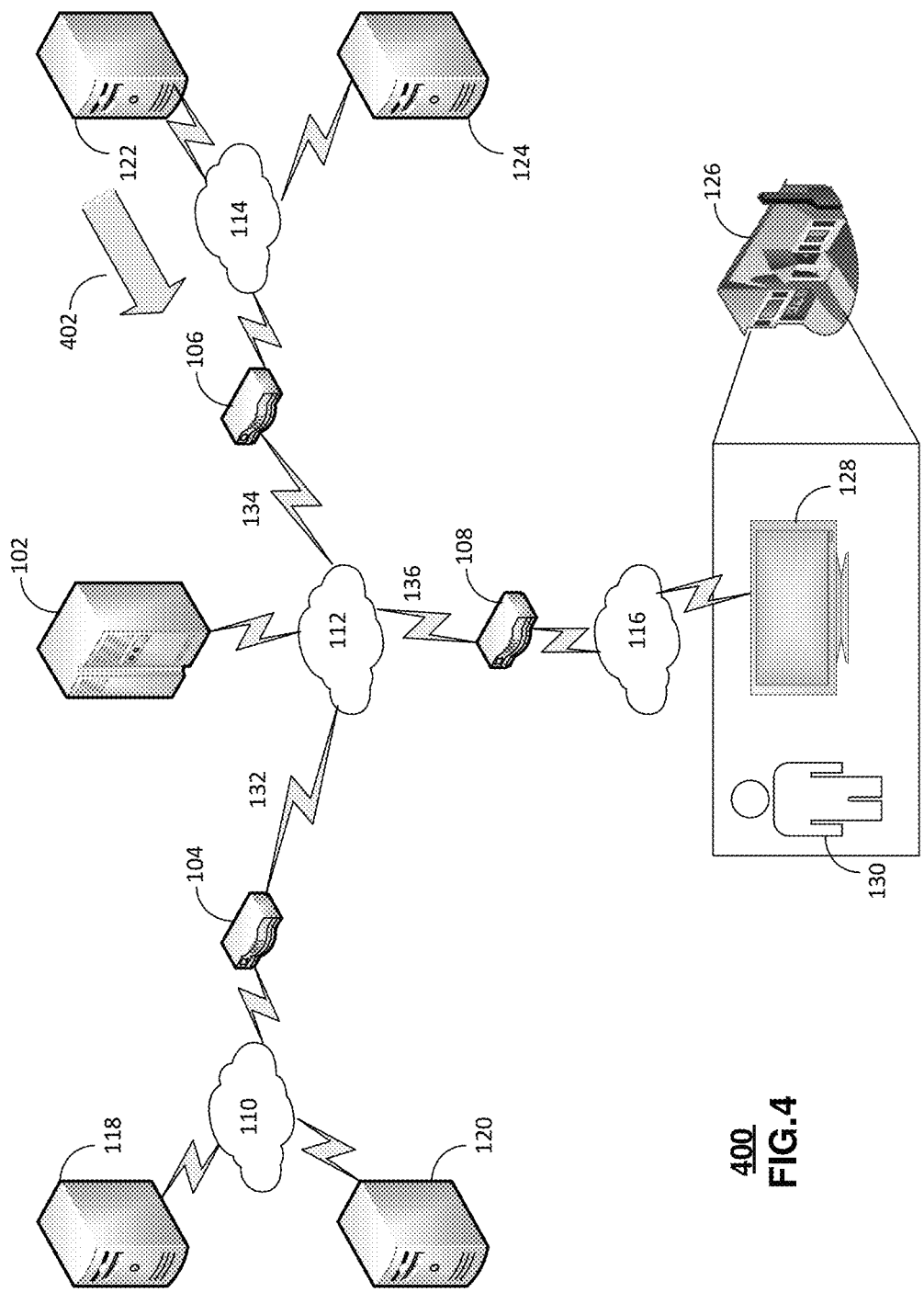

FIGS. 3-4 depict illustrative embodiments of systems for managing network video traffic. Referring to FIG. 3, in one or more embodiments, the system 300 includes components of system 100. Further, media servers 118, 120 increase their level 302, 304 of network video traffic (e.g. providing media content to users). Such increase in level of network video traffic can be transitory (e.g. first of the month so there are new media content is accessed by users) or more permanent (e.g. media servers 118 and 120 have substantially increased their library of media content).

In one or more embodiments, the network manager 102 observes or detects current network video traffic. Further, the network manager 102 identifies or otherwise determines that the current network traffic does not conform to the historical network video traffic or any other data used in training the machine learning application of the network manager 102. For example, the average network video traffic according to the historical network video traffic from media server 118, 120 can be 100 Gbps. However, the current network video traffic indicates that the average network video traffic from media server 118, 120 has increased to 150 Gbps. In response, the network manager 102 records or compiles the current network video traffic. Further, the network manager 102 re-trains the machine learning application using the current network video traffic. In addition, the network manager 102 re-provisions the network resources (e.g. processing systems/processing capacity associated with routers 104, 106, 108, bandwidth of communication links 132, 134, 136, memory allocated to routers, etc.) according to instructions from the re-trained machine learning application. Retraining the machine learning application can include determining the multiple layers of the neural network of the machine learning application according to the re-training based on the current network video traffic.

In one or more embodiments, the network manager 102 observes or otherwise detects current network video traffic that does not conform to the historical network video traffic or data used in training the machine learning application. Further, the network manager 102 can develop or identify one or more (additional) statistical states to include in the Markov logic state machine according to the current network video traffic. In other embodiments, the network manager 102 can determine one or more new/updated Markov logic state machines according to the current network video traffic. In addition, the network manager can adjust, as part of re-training the machine learning, one or more Markov logic state machines to include the one or more new statistical states or adjust the machine learning application to include the newly identified or develop Markov logic state machines.

Referring to FIG. 4, in one or more embodiments, system 400 can include the components from system 100. In some embodiments, a media server 122 may provide media content of a live event some time in the future. For example, media server 122 can receive real-time, live media content of a live concert to be streamed to users. This predicted network video traffic is provided and received by the network manager 102.

In one or more embodiments, media server 122 can increase its level 402, of network video traffic (e.g. providing media content to users). Such increase in level of network video traffic can be transitory (e.g. a live event). In some embodiments, the network manager 102 identifies or otherwise determines that the predicted network traffic does not conform to the historical network video traffic or any other data used in training the machine learning application of the network manager 102. For example, the average network video traffic according to the historical network video traffic from media server 122 can be 100 Gbps. However, the current network video traffic indicates that the average network video traffic from media server 122 has increased to 200 Gbps. Further, the network manager 102 re-trains the machine learning application using the predicted network video traffic. In addition, the network manager 102 re-provisions the network resources (e.g. processing systems/processing capacity associated with routers 104, 106, 108, bandwidth of communication links 132, 134, 136) according to the re-trained machine learning application. Retraining the machine learning application can include determining the multiple layers of the neural network of the machine learning application according to the re-training based on the current network video traffic.

In one or more embodiments, the network manager 102 determines predicted network video traffic that does not conform to the historical network video traffic or data used in training the machine learning application. Further, the network manager 102 can develop or identify one or more statistical states to include in the Markov logic state machine according to the predicted network video traffic. In other embodiments, the network manager 102 can determine one or more new/updated Markov logic state machines according to the predicted network video traffic. In addition, the network manager can adjust, as part of re-training the machine learning, to include the one or more new statistical states or adjust the machine learning application to include the newly identified or develop Markov logic state machines.

Figure 5:
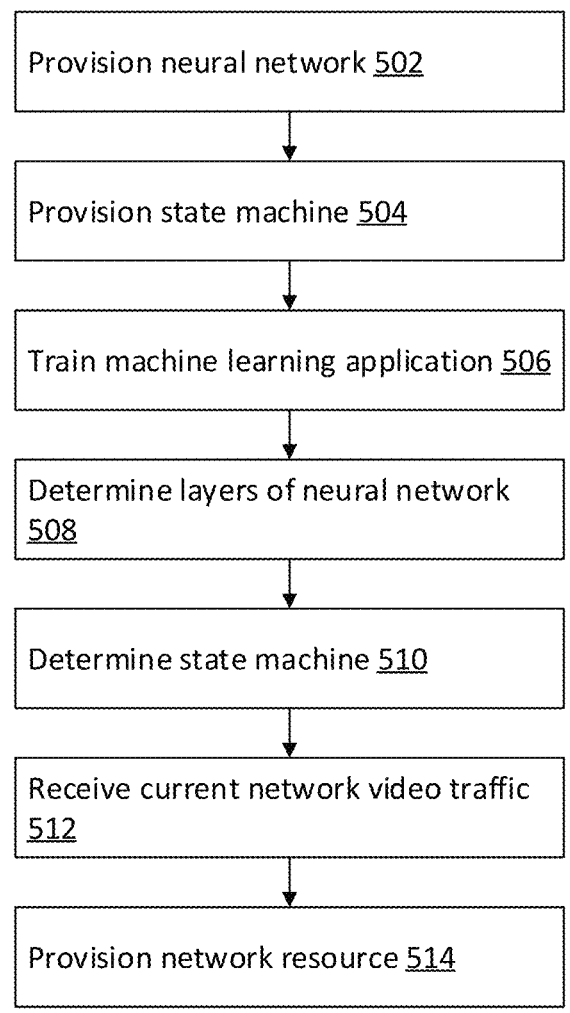
FIGS. 5-7 depict illustrative embodiments of methods used in portions of the systems described in FIGS. 1 and 3-4.
Figure 6:
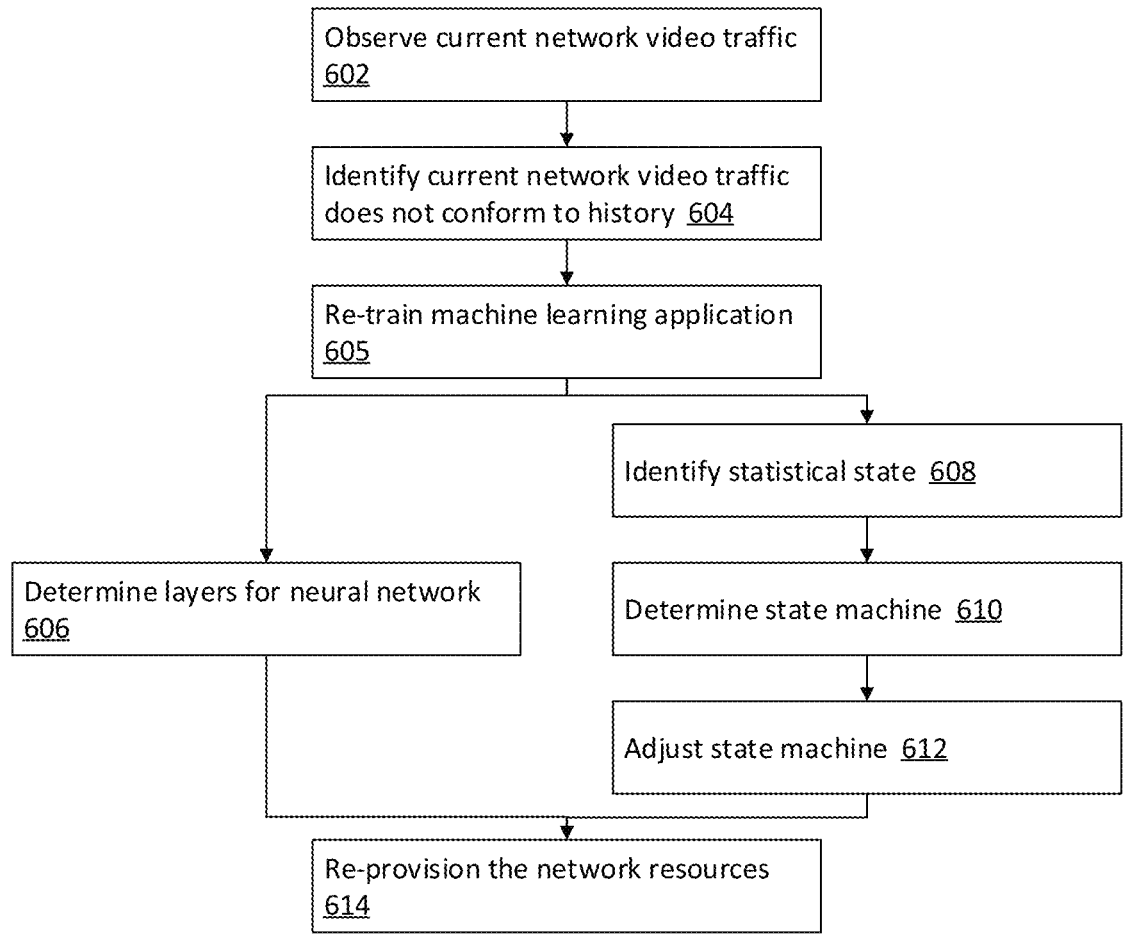
Figure 7:
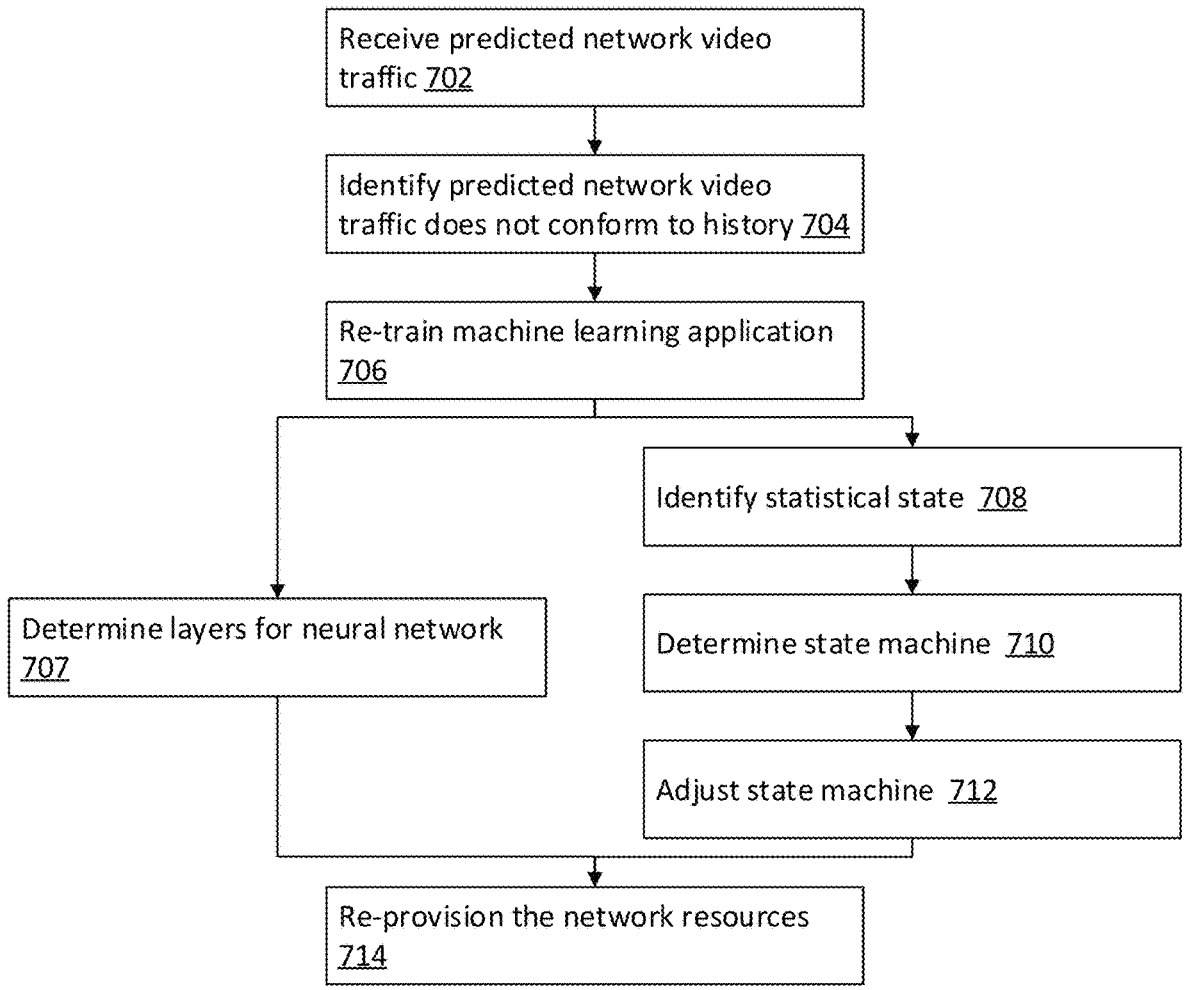

FIGS. 5-7 depict illustrative embodiments of methods used in portions of the systems described in FIGS. 1 and 3-4. The methods 500, 600, 700 can be implemented by a network manager or any other network node. Referring to FIG. 5, in one or more embodiments, the method 500 can include a network manager, at 502, provisioning a neural network. The neural network can be part of the machine learning application that include statistic-syntactic model that includes the neural network. Further, the neural network can include multiple layers. The method 500 can include a network manager, at 504, provisioning multiple Markov logic state machines among the multiple layers of the neural network. Further, the method 500 includes the network manager, at 506, training the machine learning application using historical network video traffic resulting in a trained machine learning application. In addition, the method 500 can include the network manager, at 508, determining the multiple layers of the neural network according to the training based on the historical network video traffic. This can include determining the number of nodes in each layer as well as the interconnections among nodes between layers. Further, this can also include determining the weights of inputs to each node as well as the transfer function of each node. Also, the method 500 can include the network manager, at 510, determining the plurality of Markov logic state machines according to the historical network video traffic. This can include developing or identifying the states of the state machine as well as the transitional probabilities between one state and another. Further, the method 500 can include the network manager, at 512, receiving current network video traffic. In addition, the method 500 can include the network manager, at 514, provisioning network resources to route the current network video traffic according to the trained machine learning application.

Referring to FIG. 6, in one or more embodiments, method 600 can include a network manager, at 602, observing or detecting current network video traffic. Further, the method 600 can include the network manager, at 604, identifying or determining the current network video traffic does not conform to the historical network video traffic. In addition, the method 600 can include the network manager, at 605, re-training the machine learning application using the current network video traffic resulting in a re-trained machine learning application. Also, the method 600 can include the network manager, at 606, determining the multiple layers of the neural network according to the re-training based on the current network video traffic. This can include determining the number of nodes in each layer as well as the interconnections among nodes between layers. Further, this can also include determining the weights of inputs to each node as well as the transfer function of each node. The method 600 can include the network manager, at 608, identifying one or more statistical states to include in at least one of the Markov logic state machines according to the current network video traffic. Further, the method 600 can include the network manager, at 610, determining the plurality of Markov logic state machines according to the current network video traffic. In addition, the method 600 can include the network manager, at 612, adjusting the at least one of the Markov logic state machines to include the one or more statistical states. Also, the method 600 can include the network manager, at 614, re-provisioning the network resources to route the current network video traffic according to the re-trained machine learning application.

Referring to FIG. 7, in one or more embodiments, the method 700 includes the network manager, at 702, receiving a predicted network video traffic. Further, the method 700 includes the network manager, at 704, identifying the predicted network video traffic does not conform to the historical network video traffic. In addition, the method 700 includes the network manager, at 706, re-training the machine learning application using the predicted network video traffic resulting in a re-trained machine learning application. Also, the method 700 includes the network manager, at 707, determining the plurality of layers of the neural network according to the re-training based on the predicted network video traffic.

The method 700 includes the network manager, at 708, identifying one or more statistical states to include in at least one of the Markov logic state machines according to the predicted network vide traffic. Further, the method 700 includes the network manager, at 710, determining the plurality of Markov logic state machines according to the predicted network video traffic. In addition, the method 700 includes the network manager, at 712, adjusting the at least one of the Markov logic state machines to include the one or more statistical states. Also, the method 700 includes the network manager, at 714, re-provisioning the network resources to route the current network video traffic according to the re-trained machine learning application.

While for purposes of simplicity of explanation, the respective processes are shown and described as a series of blocks in FIGS. 5-7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further, embodiments described herein and portions thereof can be combined with other embodiments or portioned thereof.

Figure 8:
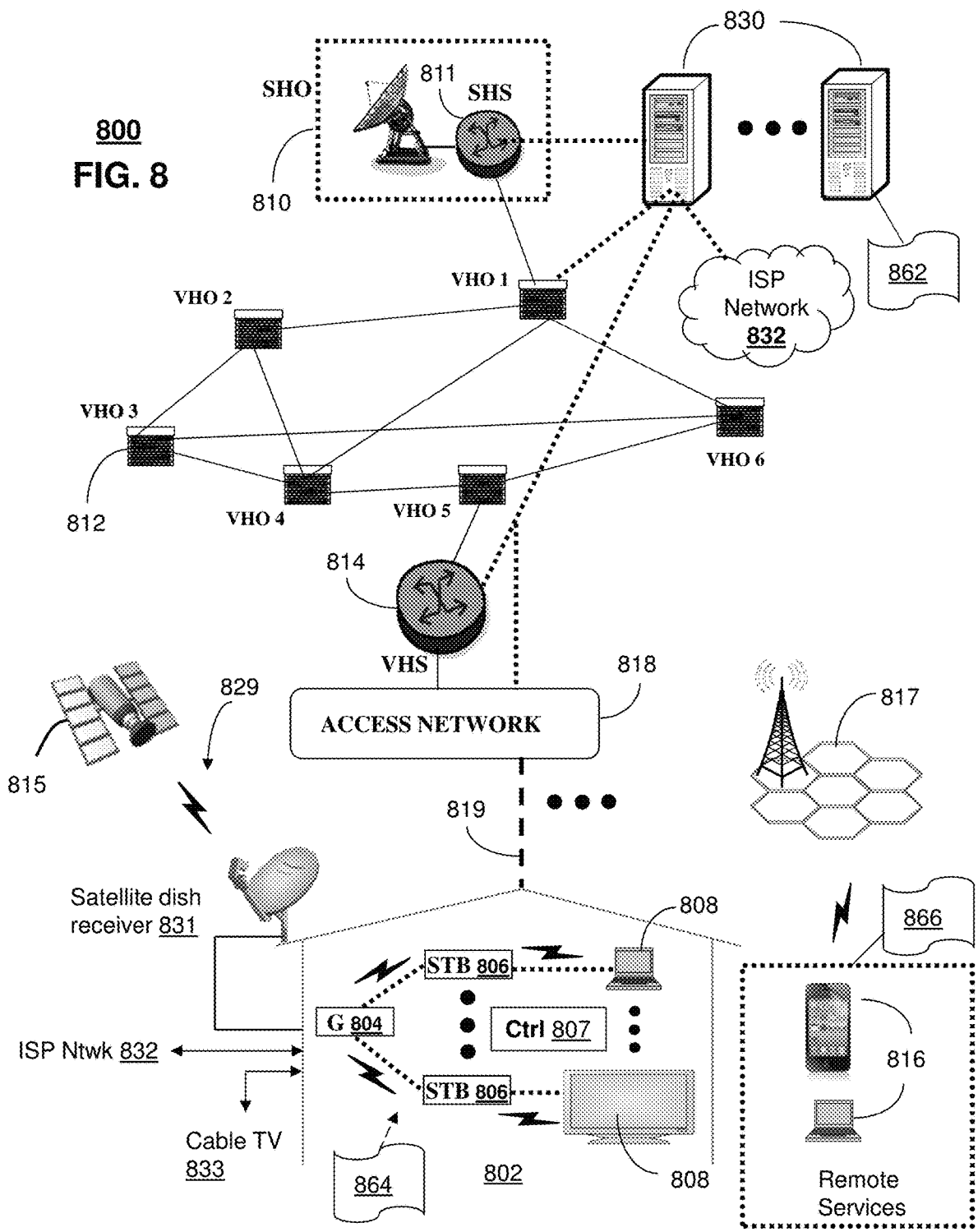
FIGS. 8-9 depict illustrative embodiments of communication systems that provide media management services.

FIG. 8 depicts an illustrative embodiment of a communication system 800 for providing various communication services, such as delivering media content. The communication system 800 can represent an interactive media network, such as an interactive television system (e.g., an Internet Protocol Television (IPTV) media system). Communication system 800 can be overlaid or operably coupled with refer to system 100, 300, 400 of FIGS. 1, 3-4 as another representative embodiment of communication system 800. For instance, one or more devices illustrated in the communication system 800 of FIG. 8 such as network manager 830 can provision a neural network comprising a plurality of layers and provision a plurality of Markov logic state machines among the plurality of layers of the neural network resulting in a machine learning application. Further, the network manager 830 can train the machine learning application 862 using historical network video traffic resulting in a trained machine learning application. In addition, the network manager 830 can receive current network video traffic and provision network resources to route the current network video traffic according to the trained machine learning application 862.

In one or more embodiments, the communication system 800 can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol. The VHS 814 can distribute multimedia broadcast content via an access network 818 to commercial and/or residential buildings 802 housing a gateway 804 (such as a residential or commercial gateway).

The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
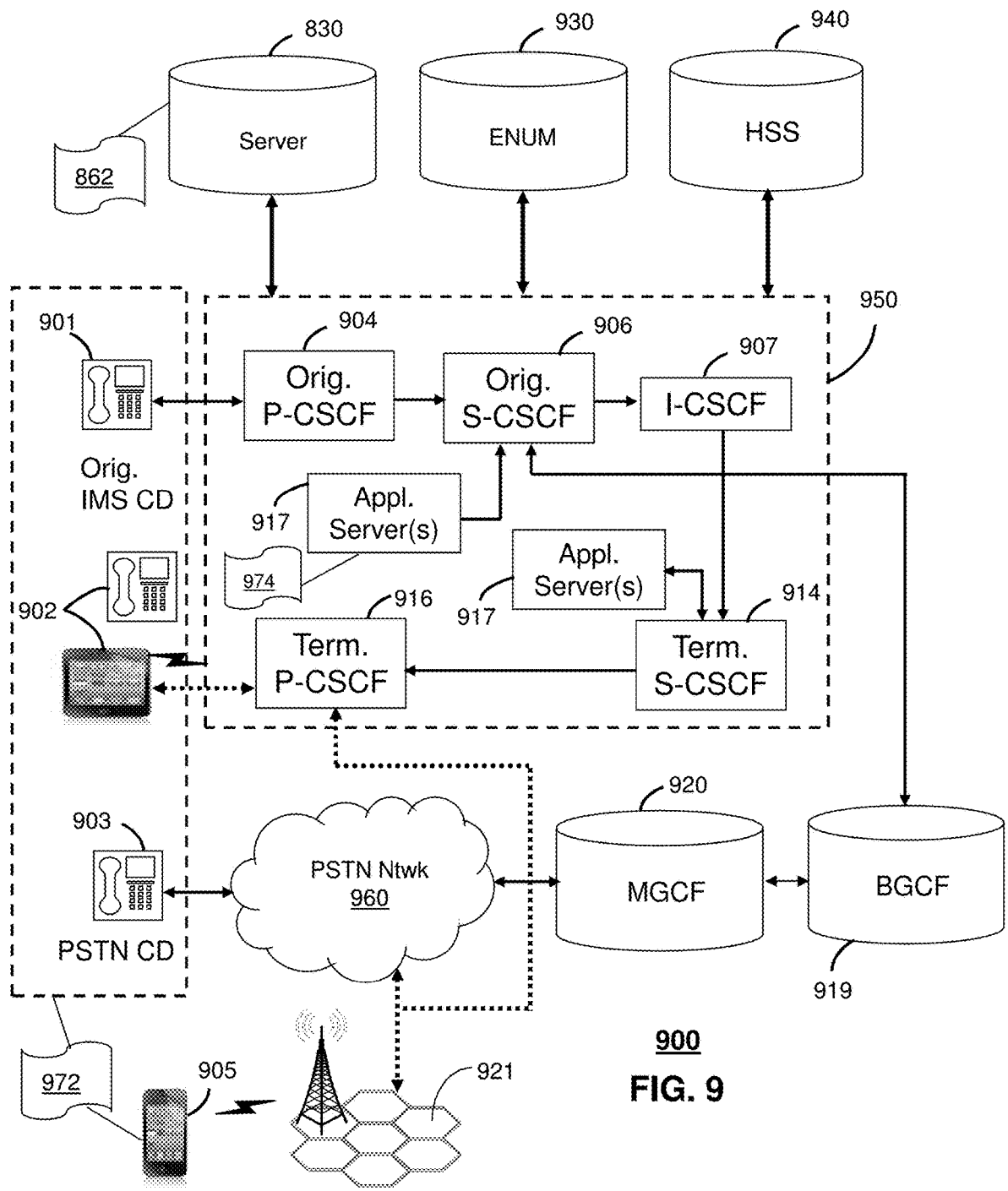

FIG. 9 depicts an illustrative embodiment of a communication system 900 employing an IP Multimedia Subsystem (IMS) network architecture to facilitate the combined services of circuit-switched and packet-switched systems. Communication system 900 can be overlaid or operably coupled with system 100, 300, 400 of FIGS. 1, 3, and 4 and communication system 800 as another representative embodiment of communication system 800.

In one or more embodiments, the network manager 830 can provision a neural network comprising a plurality of layers and provision a plurality of Markov logic state machines among the plurality of layers of the neural network resulting in a machine learning application. Further, the network manager 830 can train the machine learning application 862 using historical network video traffic resulting in a trained machine learning application 862 and determine the plurality of layers of the neural network according to the training based on the historical network video traffic receiving current network video traffic. In addition, the network manager 830 can provisioning network resources to route the current network video traffic according to the trained machine learning application 862.

Communication system 900 can comprise a Home Subscriber Server (HSS) 940, a tElephone NUmber Mapping (ENUM) server 930, and other network elements of an IMS network 950. The IMS network 950 can establish communications between IMS-compliant communication devices (CDs) 901, 902, Public Switched Telephone Network (PSTN) CDs 903, 905, and combinations thereof by way of a Media Gateway Control Function (MGCF) 920 coupled to a PSTN network 960. The MGCF 920 need not be used when a communication session involves IMS CD to IMS CD communications. A communication session involving at least one PSTN CD may utilize the MGCF 920.

IMS CDs 901, 902 can register with the IMS network 950 by contacting a Proxy Call Session Control Function (P-CSCF) which communicates with an interrogating CSCF (I-CSCF), which in turn, communicates with a Serving CSCF (S-CSCF) to register the CDs with the HSS 940. To initiate a communication session between CDs, an originating IMS CD 901 can submit a Session Initiation Protocol (SIP INVITE) message to an originating P-CSCF 904 which communicates with a corresponding originating S-CSCF 906. The originating S-CSCF 906 can submit the SIP INVITE message to one or more application servers (ASs) 917 that can provide a variety of services to IMS subscribers.

For example, the application servers 917 can be used to perform originating call feature treatment functions on the calling party number received by the originating S-CSCF 906 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 906 can submit queries to the ENUM system 930 to translate an E.164 telephone number in the SIP INVITE message to a SIP Uniform Resource Identifier (URI) if the terminating communication device is IMS-compliant. The SIP URI can be used by an Interrogating CSCF (I-CSCF) 907 to submit a query to the HSS 940 to identify a terminating S-CSCF 914 associated with a terminating IMS CD such as reference 902. Once identified, the I-CSCF 907 can submit the SIP INVITE message to the terminating S-CSCF 914. The terminating S-CSCF 914 can then identify a terminating P-CSCF 916 associated with the terminating CD 902. The P-CSCF 916 may then signal the CD 902 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 9 may be interchangeable. It is further noted that communication system 900 can be adapted to support video conferencing. In addition, communication system 900 can be adapted to provide the IMS CDs 901, 902 with the multimedia and Internet services of communication system 800 of FIG. 8.

If the terminating communication device is instead a PSTN CD such as CD 903 or CD 905 (in instances where the cellular phone only supports circuit-switched voice communications), the ENUM system 930 can respond with an unsuccessful address resolution which can cause the originating S-CSCF 906 to forward the call to the MGCF 920 via a Breakout Gateway Control Function (BGCF) 919. The MGCF 920 can then initiate the call to the terminating PSTN CD over the PSTN network 960 to enable the calling and called parties to engage in voice and/or data communications.

It is further appreciated that the CDs of FIG. 9 can operate as wireline or wireless devices. For example, the CDs of FIG. 9 can be communicatively coupled to a cellular base station 921, a femtocell, a WiFi router, a Digital Enhanced Cordless Telecommunications (DECT) base unit, or another suitable wireless access unit to establish communications with the IMS network 950 of FIG. 9. The cellular access base station 921 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 9.

Cellular phones supporting LTE can support packet-switched voice and packet-switched data communications and thus may operate as IMS-compliant mobile devices. In this embodiment, the cellular base station 921 may communicate directly with the IMS network 950 as shown by the arrow connecting the cellular base station 921 and the P-CSCF 916.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The network manager 830 of FIG. 8 can be operably coupled to communication system 900 for purposes similar to those described above. Network manager 830 can perform functions related to the machine learning application 862 similar to the functions described for network manager 102 of FIGS. 1, 3, and 4 in accordance with methods 500, 600, 700 of FIGS. 5-7. Network manager 830 can be an integral part of the application server(s) 917 performing functions of a machine learning application 974, which can be substantially similar to function 862 and adapted to the operations of the IMS network 950.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 10:
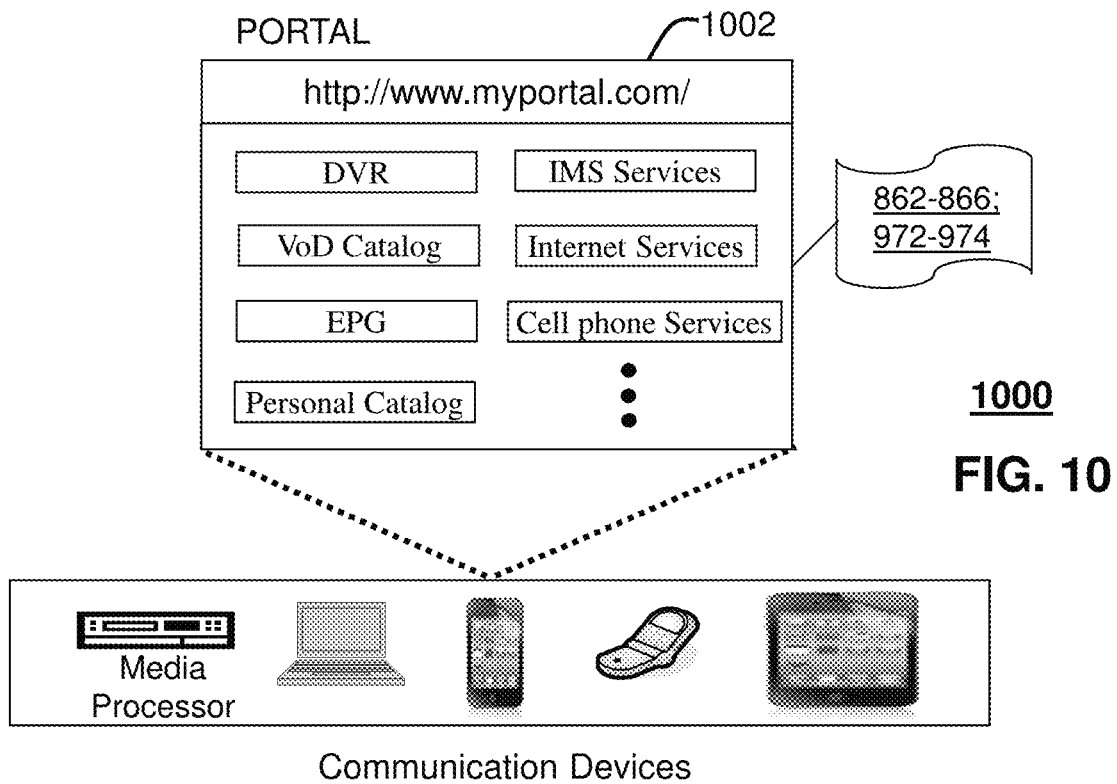
FIG. 10 depicts an illustrative embodiment of a web portal for interacting with the communication systems of providing and managing media services.

FIG. 10 depicts an illustrative embodiment of a web portal 1002 of a communication system 1000. Communication system 1000 can be overlaid or operably coupled with systems 100, 300, 400 of FIGS. 1, 3, and 4, communication system 800, and/or communication system 900 as another representative embodiment of systems 100, 300, 400 of FIGS. 1, 3, and 4, communication system 800, and/or communication system 900. The web portal 1002 can be used for managing services of systems 100, 300, 400 of FIGS. 1, 3, and 4 and communication systems 800-900. A web page of the web portal 1002 can be accessed by a Uniform Resource Locator (URL) with an Internet browser using an Internet-capable communication device such as those described in FIGS. 1, 3, and 4 and FIGS. 8-9. The web portal 1002 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 1002 can also be used for provisioning IMS services described earlier, provisioning Internet services, provisioning cellular phone services, and so on.

The web portal 1002 can further be utilized to manage, provision, or train machine learning applications 862 and 974 to adapt these applications as may be desired by subscribers and/or service providers of systems 100, 300, 400 of FIGS. 1, 3, and 4, and communication systems 800-900. For instance, service prover personnel can train network manager 830 and its machine learning application 862 with historical network video traffic or provide with predicted network video traffic to retrain a machine learning application 862, as described herein. Further, service provider personnel can log onto an administrator account to provision, monitor and/or maintain the systems 100, 300, 400 of FIGS. 1, 3, and 4 or server 830.

Figure 11:
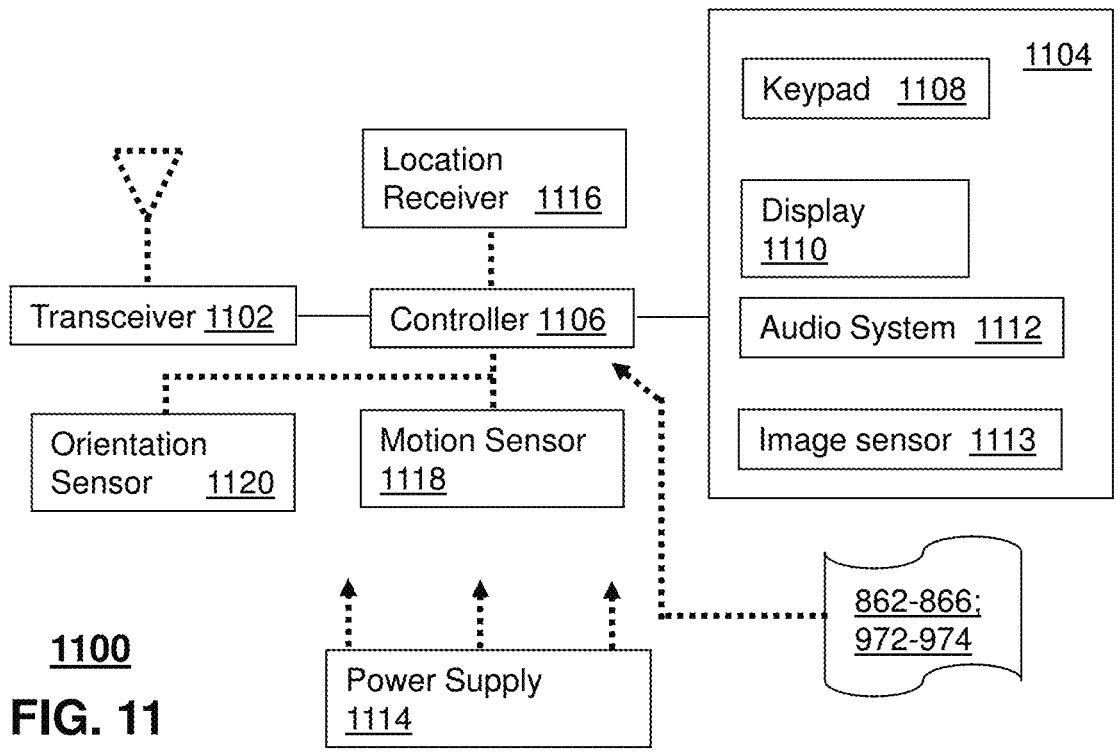
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 1, 3 and 4, and FIGS. 8-9 and can be configured to perform portions of [methods 500, 600, 700 of FIGS. 5-7.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of devices of FIGS. 1, 3, and 4, the media processor 806, the media devices 808, or the portable communication devices 816 of FIG. 8, as well as the IMS CDs 901-902 and PSTN CDs 903-905 of FIG. 9. It will be appreciated that the communication device 1100 can also represent other devices that can operate in systems 100, 300, 400 of FIGS. 1, 3, and 4, communication systems 800-900 of FIGS. 8-9 such as a gaming console and a media player. In addition, the controller 1106 can be adapted in various embodiments to perform the functions 862 and 974.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
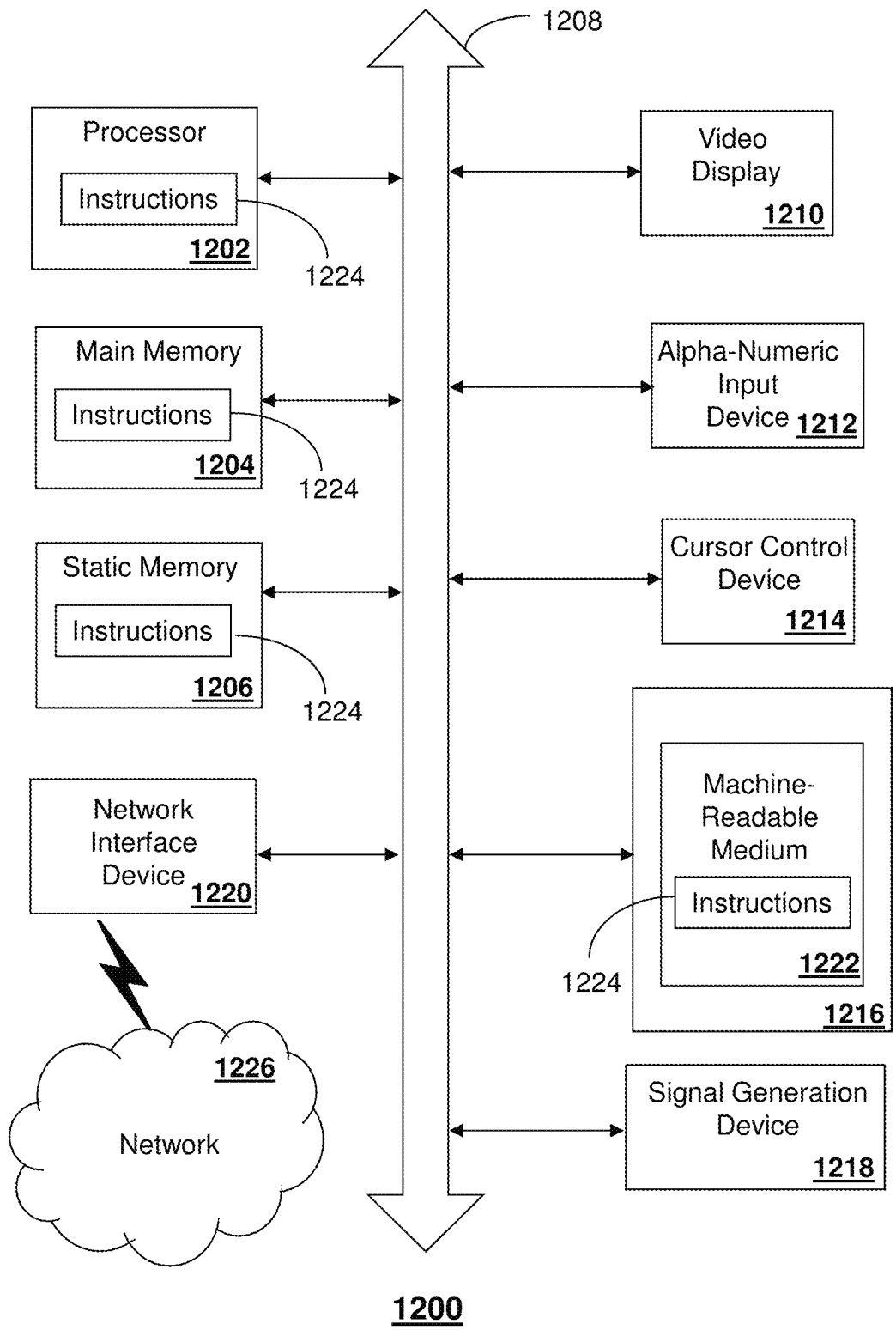
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the network manager 830, and other devices of FIGS. 1, 3 4, 8-11 In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
provisioning a neural network comprising a plurality of layers;
obtaining historical network video traffic associated with a network;
determining a plurality of states and determining a plurality of state transitions for each of a plurality of Markov logic state machines according to the historical network video traffic, wherein the plurality of states include a high level equilibrium state of a network resource, a low level equilibrium state of the network resource, a negative transition state, and a positive transition state, wherein the plurality of state transitions comprises probability to transition among the plurality of states according to the historical network video traffic;
provisioning the plurality of Markov logic state machines among the plurality of layers of the neural network according to the plurality of states and the plurality of state transitions resulting in a machine learning application;
training the machine learning application using the historical network video traffic resulting in a trained machine learning application;
detecting first network video traffic during a first time period; and
identifying a high level equilibrium value associated with the high level equilibrium state and identifying a low level equilibrium value associated with the low level equilibrium state according to the trained machine learning application and the first network video traffic; and
provisioning network resources to route second network video traffic for a second time period according to a first allocation of the network resources in response to determining the first allocation of the network resources for the second network video traffic for the second time period according to the high level equilibrium value and the low level equilibrium value utilizing the trained machine learning application.

2. The device of claim 1, wherein the operations further comprise determining the plurality of layers of the neural network according to the historical network video traffic.

3. The device of claim 1, wherein the operations further comprise identifying a transition value for each of the plurality of state transitions for each of the plurality of Markov logic state machines resulting in a plurality of transition values, wherein the determining of the first allocation of the network resources comprises determining the first allocation of network resources according to the plurality of transition values.

4. The device of claim 1, wherein the operations further comprise:
 detecting third network video traffic during a third time period;
 identifying the third network video traffic during the third time period does not conform to the historical network video traffic;
 re-training the machine learning application using the third network video traffic during the third time period resulting in a re-trained machine learning application; and
 re-provisioning the network resources to route fourth network video traffic for a fourth time period according to a second allocation of the network resources in response to determining the second allocation of network resources for the fourth network video traffic for the fourth time period utilizing the re-trained machine learning application.

5. The device of claim 4, wherein the operations further comprise determining the plurality of layers of the neural network according to the third network video traffic during the third time period.

6. The device of claim 1, wherein the network resources comprises bandwidth of each of a plurality of links in the network.

7. The device of claim 6, wherein the high level equilibrium value is a high level equilibrium bandwidth of each of the plurality of links in the network and the low level equilibrium value is a low level equilibrium bandwidth of each of the plurality of links in the network.

8. The device of claim 1, wherein the operations further comprise:
 receiving a predicted network video traffic;
 identifying the predicted network video traffic does not conform to the historical network video traffic;
 re-training the machine learning application using the predicted network video traffic resulting in a re-trained machine learning application; and
 re-provisioning the network resources to route the second network video traffic for the second time period according to the re-trained machine learning application.

9. The device of claim 8, wherein the operations further comprise determining the plurality of layers of the neural network according to the predicted network video traffic.

10. The device of claim 1, wherein the network resources comprises processing power of each of a plurality of servers in the network.

11. The device of claim 10, wherein the high level equilibrium value is a high level equilibrium processing power of each of the plurality of servers in the network and the low level equilibrium value is a low level equilibrium processing power of each of the plurality of servers in the network.

12. A non-transitory, machine-readable storage medium, comprising executable instructions that, when executed by a processing system including a processor, facilitate performance of operations, comprising:
 provisioning a neural network comprising a plurality of layers;
 obtaining historical network video traffic associated with a network;
 determining a plurality of states and determining a plurality of state transitions for each of a plurality of Markov logic state machines according to the historical network video traffic, wherein the plurality of states include a high level equilibrium state of a network resource, a low level equilibrium state of the network resource, a negative transition state, and a positive transition state, wherein the plurality of state transitions comprises probability to transition among the plurality of states according to the historical network video traffic;
 provisioning the plurality of Markov logic state machines among the plurality of layers of the neural network according to the plurality of states and the plurality of state transitions resulting in a machine learning application;
 training the machine learning application using historical network video traffic resulting in a trained machine learning application;
 detecting first network video traffic during a first time period; and
 identifying a high level equilibrium value associated with the high level equilibrium state and identifying a low level equilibrium value associated with the low level equilibrium state according to the trained machine learning application and the first network video traffic; and
 provisioning network resources to route second network video traffic for a second time period according to a first allocation of the network resources in response to determining the first allocation of the network resources for the second network video traffic for the second time period according to the high level equilibrium value and the low level equilibrium value utilizing the trained machine learning application.

13. The non-transitory, machine-readable storage medium of claim 12, wherein the operations further comprise identifying a transition value for each of the plurality of state transitions for each of the plurality of Markov logic state machines resulting in a plurality of transition values, wherein the determining of the first allocation of the network resources comprises determining the first allocation of network resources according to the plurality of transition values.

14. The non-transitory, machine-readable storage medium of claim 12, wherein the operations further comprise:
 detecting third network video traffic during a third time period;
 identifying the third network video traffic during the third time period does not conform to the historical network video traffic;
 re-training the machine learning application using the third network video traffic during the third time period resulting in a re-trained machine learning application; and re-provisioning the network resources to route fourth network video traffic for a fourth time period according to a second allocation of the network resources in response to determining the second allocation of resources for the fourth network video traffic for the fourth time period utilizing the re-trained machine learning application.

15. The non-transitory, machine-readable storage medium of claim 12, wherein the network resource comprises bandwidth of each of a plurality of links in the network, wherein the high level equilibrium value is a high level equilibrium bandwidth of each of the plurality of links in the network and the low level equilibrium value is a low level equilibrium bandwidth of each of the plurality of links in the network.

16. The non-transitory, machine-readable storage medium of claim 12, wherein the network resources comprises processing power of each of a plurality of servers in the network, wherein the high level equilibrium value is a high level equilibrium processing power of each of the plurality of servers in the network and a low level equilibrium value is a low level equilibrium processing power of each of the plurality of servers in the network.

17. A method, comprising:
provisioning, by a processing system including processor, a neural network comprising a plurality of layers;
obtaining, by the processing system, historical network video traffic associated with a network;
determining, by the processing system, a plurality of states and determining, by the processing system, a plurality of state transitions for each of a plurality of Markov logic state machines according to the historical network video traffic, wherein the plurality of states include a high level equilibrium state of a network resource, a low level equilibrium state of the network resource, a negative transition state, and a positive transition state, wherein the plurality of state transitions comprises probability to transition among the plurality of states according to the historical network video traffic;
provisioning, by the processing system, the plurality of Markov logic state machines among the plurality of layers of the neural network according to the plurality of states and the plurality of state transitions resulting in a machine learning application;
training by the processing system, the machine learning application using historical network video traffic resulting in a trained machine learning application;

detecting, by the processing system, first network video traffic during a first time period; and
identifying, by the processing system, a high level equilibrium value associated with the high level equilibrium state and identifying a low level equilibrium value associated with the low level equilibrium state according to the trained machine learning application and the first network video traffic; and
provisioning, by the processing system, network resources to route second network video traffic for a second time period according to a first allocation of the network resources in response to determining, by the processing system, the first allocation of the network resources for the second network video traffic for the second time period according to the high level equilibrium value and the low level equilibrium value utilizing the trained machine learning application.

18. The method of claim 17, wherein the network resources comprises bandwidth of each of a plurality of links in the network, wherein the high level equilibrium value is a high level equilibrium bandwidth of each of the plurality of links in the network and the low level equilibrium value is a low level equilibrium bandwidth of each of the plurality of links in the network.

19. The method of claim 17, comprising:
receiving, by the processing system, a predicted network video traffic;
identifying, by the processing system, the predicted network video traffic does not conform to the historical network video traffic;
re-training, by the processing system, the machine learning application using the predicted network video traffic resulting in a re-trained machine learning application; and
re-provisioning, by the processing system, the network resources to route the second network video traffic for the second time period according to the re-trained machine learning application.

20. The method of claim 17, wherein the network resource comprises processing power of each of a plurality of servers in the network, wherein the high level equilibrium value is a high level equilibrium processing power of each of the plurality of servers in the network and a low level equilibrium value is a low level equilibrium processing power of each of the plurality of servers in the network.

* * * * *